US008949347B2

(12) United States Patent
Errico et al.

(10) Patent No.: US 8,949,347 B2
(45) Date of Patent: Feb. 3, 2015

(54) CERTIFIED EMAIL MESSAGES AND ATTACHMENTS

(75) Inventors: Stephen Errico, Charlotte, NC (US); Steven Pfrenzinger, Palm Desert, CA (US)

(73) Assignee: PrivacyDataSystems, LLC, Charlotte, NC (US)

( * ) Notice: Subject to any disclaimer, the term of this patent is extended or adjusted under 35 U.S.C. 154(b) by 470 days.

(21) Appl. No.: 12/937,640

(22) PCT Filed: Apr. 10, 2009

(86) PCT No.: PCT/US2009/040175
§ 371 (c)(1),
(2), (4) Date: Nov. 16, 2010

(87) PCT Pub. No.: WO2009/129134
PCT Pub. Date: Oct. 22, 2009

(65) Prior Publication Data
US 2011/0276638 A1    Nov. 10, 2011

Related U.S. Application Data

(60) Provisional application No. 61/044,544, filed on Apr. 14, 2008.

(51) Int. Cl.
G06F 15/16 (2006.01)
H04L 29/06 (2006.01)
G06Q 10/10 (2012.01)
H04L 12/58 (2006.01)

(52) U.S. Cl.
CPC .......... *H04L 63/0861* (2013.01); *G06Q 10/107* (2013.01); *H04L 12/5875* (2013.01); *H04L 12/5885* (2013.01); *H04L 51/30* (2013.01); *H04L 51/34* (2013.01); *H04L 12/585* (2013.01)
USPC ........................................................ 709/206

(58) Field of Classification Search
USPC ........................................................ 709/206
See application file for complete search history.

(56) References Cited

U.S. PATENT DOCUMENTS

| 5,881,226 | A  | * | 3/1999  | Veneklase ........................ 726/16 |
| 6,256,737 | B1 | * | 7/2001  | Bianco et al. ................. 713/186 |
| 6,356,937 | B1 | * | 3/2002  | Montville et al. ............ 709/206 |
| 6,594,693 | B1 |   | 7/2003  | Borwankar |
| 6,609,206 | B1 | * | 8/2003  | Veneklase ......................... 726/7 |
| 6,981,023 | B1 | * | 12/2005 | Hamilton et al. ............. 709/206 |
| 7,337,467 | B2 | * | 2/2008  | Veneklase ........................ 726/5 |
| 7,519,826 | B2 | * | 4/2009  | Carley .......................... 713/182 |

(Continued)

*Primary Examiner* — Brian P Whipple
(74) *Attorney, Agent, or Firm* — Clements Bernard PLLC; Christopher L. Bernard; Lawrence A. Baratta, Jr.

(57) ABSTRACT

Systems and methods for electronically communicating messages between a sender and a recipient, including: means for composing a text, audio, or video message on a network device; means for sealing said message with the biometric identification of sender, where only a numeric representation of biometric information is stored for authentication purposes, not the biometric information itself; means for encrypting said message; means for sending said encrypted message over a private network, where no server to server duplication or store and forward protocol is used; means for tracking said sent encrypted message; means for informing the recipient of the message to take delivery of the message; and means for allowing the recipient to take delivery of the message after the recipient confirms his/her identification with biometrics, and after un-encrypting the message.

20 Claims, 3 Drawing Sheets

(56) References Cited

U.S. PATENT DOCUMENTS

Figure 1:
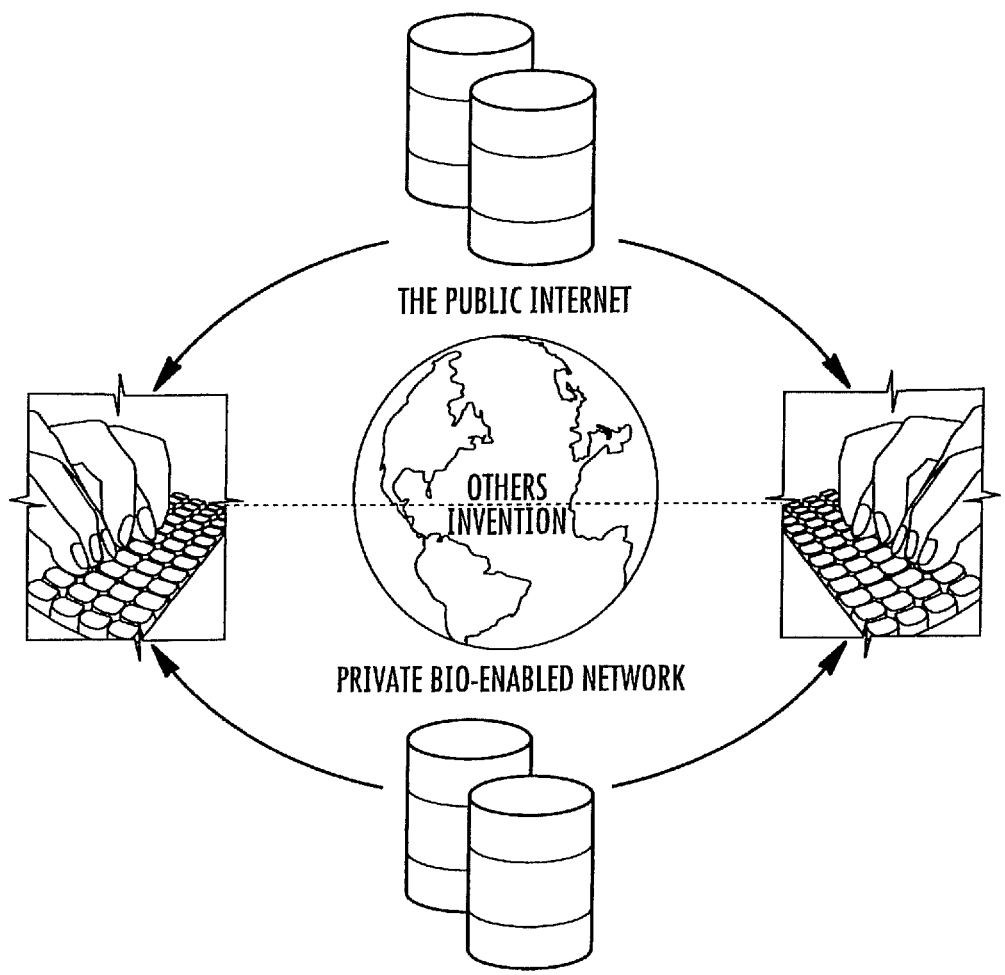

| | | |
|---|---|---|
| 7,571,472 B2 * | 8/2009 | Royer .................. 726/19 |
| 7,941,829 B2 * | 5/2011 | Carley ................. 726/4 |
| 8,341,707 B2 * | 12/2012 | Carley ................. 726/4 |
| 2003/0095641 A1 * | 5/2003 | Vishik et al. ............. 379/88.02 |
| 2004/0054932 A1 * | 3/2004 | Veneklase ............... 713/202 |
| 2005/0198170 A1 | 9/2005 | LeMay et al. |
| 2007/0005717 A1 | 1/2007 | LeVasseur et al. |
| 2007/0280510 A1 | 12/2007 | Owen et al. |
| 2008/0148371 A1 * | 6/2008 | Veneklase .............. 726/5 |
| 2009/0109482 A1 * | 4/2009 | Sato .................... 358/1.15 |
| 2009/0187966 A1 * | 7/2009 | Carley ................. 726/1 |
| 2009/0265555 A1 * | 10/2009 | Royer .................. 713/168 |
| 2010/0041374 A1 * | 2/2010 | Vishik et al. ............ 455/411 |
| 2011/0179470 A1 * | 7/2011 | Carley ................. 726/4 |

* cited by examiner

US 8,949,347 B2

CERTIFIED EMAIL MESSAGES AND ATTACHMENTS

CROSS-REFERENCE TO RELATED APPLICATION(S)

The current application claims the benefit of the earlier priority filing date of the provisional application Ser. No. 61/044,544, that was filed on Apr. 14, 2008.

BACKGROUND OF THE INVENTION

1) Field of the Invention

The present invention combines 1) biometrics (fingerprint scans, iris scans, facial recognition scans, DNA, . . . ) with 2) a separate and secure network and email infrastructure, 3) email management processes, and 4) the addition of text, audio and visual format options to sending emails messages; all within the integrated, coordinated, easy-to-use framework of a fully certified email system. The result is a complete solution with major improvements in 1) sender and recipient identity verification, 2) security and privacy, 3) proof of delivery, and 4) effectiveness in communications, during the exchange of certified email messages and attachments while using the Invention.

2) Prior Art

The use of electronic mail (email) and attachments have grown substantially over the last few decades. Unfortunately, so have the problems of identity verification, security, privacy and proof of delivery; not to mention all the spam, viruses, and other harmful malware which has become the norm with using the popular, everyday email systems like HOTMAIL, AOL, GMAIL and even OUTLOOK. And, most use the "very public and very vulnerable" Internet as their worldwide network.

Millions of these international email users receive emails and attachments from people they don't know or from people they are not certain as to whether "they are who they say they are". The challenge is, how does a recipient determine the legitimacy or know the true intentions of the sender in the world of the "Unvetted Public Internet". Before a user opens their latest emails and/or attachments, they pause and worry; even when the senders' names are familiar to them, like a friend or their local banker. The questions—"is that really you?" and "what are your intentions?" haunts every recipient as they decide to either open or delete the latest entries in their Inbox. And, as spam filters try to assist, they often catch the good emails (with the bad) that users do want, causing them to continually review the contents of the spam log to identify and retrieve them for normal viewing.

Even the senders of emails worry and wonder if what they send gets to the right location or to the intended person, especially when exchanging important (e.g., confidential), high-value email messages and files. When the user hits the "send" button they are not certain that their message is secure, private, or if it gets to their named recipient or falls into the hands of an unintended recipient. Many emails never get to their intended recipient (for a variety of reasons) and that both the sender and recipient are never notified of that fact? In addition, if proof of delivery is important, how can senders prove the email got to the right location, the intended recipient and whether it was viewed and/or downloaded by the correct person? Or, might it have gone to, or been intercepted by, someone maliciously pretending to be the recipient? Or, might the recipient say they never received it when they actually did? All it takes these days in most everyday email systems is to know someone's User ID and password and they can wreak havoc in their personal or professional lives, or even cause the demise of a publicly traded company if insider information (within an email message) is stolen or intercepted by those not intended to see such confidential information. For more sophisticated intruders, many other tools and techniques are available to intercept and disrupt a supposedly-private communication.

Some earlier (so-called) certified email efforts have produced companies that have tried to provide certification services (to prove the trustworthiness of the senders). But, they do so within the low-security infrastructure of the popular, everyday email systems like HOTMAIL, AOL, GMAIL and OUTLOOK and the "very public and very vulnerable" Internet they use as their worldwide network. Plus, they allow marketing companies to become users of their service, which then try to give their mass number of recipients the feeling that their emails are worthy of opening. So, the sender of certified email in this environment may not have included a virus or malware in it, but it's still "junk mail" (a.k.a. unwanted spam) if it was unsolicited.

As a result, millions of senders and recipients worldwide spend billions of dollars each year to exchange "paper documents" via FEDEX, UPS, Certified Postal Mail, and other international package delivery services; often simply to insure that the documents get there and to have some way of proving it. Although, these services simply get their package to "an adult at the address specified", and make no guaranteed (or effort) to get it to the person named on the delivery form. Such delivery concerns, even minimally resolved, are causing senders and recipients to endure these substantial expenses and time delays. Many of these same documents could easily be exchanged electronically in their everyday email systems, but they require 1) recipient identity verification, 2) security and privacy and 3) proof of delivery.

Also, with busy days and hectic schedules few people talk directly these days and often settle to exchange email messages and attachments. But, textual (word based) email messages are one-dimensional, cumbersome to type, require use of a keyboard, are lacking in precision, add to confusion (e.g., what did they really mean by that?) and filled with popular typing short cuts like ☺ or ☻ to try and add emphasis.

To fully and effectively communicate in an email message, the sender must have 3 message format options (text, audio and visual), plus some number of attachments. This is because in human communications, when two parties are not physically together, the exchange can involve only these 3 dimensions (i.e., smell and touch being the missing dimensions). It has been proven that this type of 3-dimension message configuration has the following value and effectiveness for each of the three; 7% to the words (text), 38% to "how" they are audibly spoken (e.g., intonation, cadence, modulation . . . ) and 55% to the body language (the visual) of the speaker.

So, with a maximum of 100% effectiveness as a possibility, a text-only email message can be no more than 7% as effective as a comparable visual (video) message, with sound. An audio-only email message can be no more than 45% as effective as a comparable visual message, with sound. The "benchmark" against which all remote communications are valued in effectiveness are based on a visual message with sound that allows the recipient to hear the words spoken and see the speaker's body language (e.g., facial expressions, posture, hand motions, head motion and so on). Yet, even if 100% effective communication options were possible today in most popular message exchanges, many senders and recipients would be reluctant to use them for fear that such crisp, clear and concise messages might fall into improper hands due to lesser security and greater vulnerability of popular, public-Internet-based email systems.

This section conveys competitors and existing solutions available in the market today and highlights why they are an inadequate solutions when compared to those provided by the Invention documented herein.

3) Prior Existing Solutions
1. GOODMAIL
   a. The design is focused on "pre-confirming" so-called "good senders" through the public email network to assure recipients that the senders are legitimate
   b. But their solution is inadequate because:
      i. They do not offer recipient proof of delivery features, and
      ii. They do not offer a separate, secure network and infrastructure and email management system, and thus cannot provide adequate levels of security and privacy, and
      iii. They do utilize existing open/public email systems and thus are vulnerable to their same inadequacies in security and privacy, and
      iv. They do not accommodate very large attachments, and
      v. They do not support voice or visual (video) email message formats, and
      vi. They do not offer biometric identity verification.
2. READNOTIFY
   a. This provides an email proof of delivery system as an add on to existing email systems
   b. But their solution is inadequate because:
      i. They do provide limited proof of delivery, but they do not confirm the identity of the recipient or sender, and
      ii. They do not offer a separate, secure network and infrastructure and email management system, and thus can not provide adequate levels of security and privacy, and
      iii. They do utilize existing open/public email systems and thus are vulnerable to their same inadequacies in security and privacy, and
      iv. They do not provide for very large attachments, and
      v. They do not support audio or visual (video) email message formats, and
      vi. They do not offer biometric identity verification.
3. POINT OF MAIL
   a. This is a proof of delivery system that will tell you an IP address that read or opened a message within an existing email system
   b. But their solution is inadequate because:
      i. They are not able to authenticate the identity of a recipient or a sender, and
      ii. They do not offer a separate, secure network and infrastructure and email management system, and thus can not provide adequate levels of security and privacy, and
      iii. They do utilize existing open/public email systems and thus are vulnerable to their same inadequacies in security and privacy, and
      iv. They do not address the need for large attachments, and
      v. They do not support voice or video email messages, and
      vi. They do not offer biometric identity verification.
4. RPOST
   a. They offer features to support proof of delivery to a specific computer
   b. But their solution is inadequate because:
      i. They can not confirm the identity of a recipient, or the sender, and
      ii. They do not offer a separate, secure network and infrastructure and email management system, and thus can not provide adequate levels of security and privacy, and
      iii. They do utilize existing open/public email systems and thus are vulnerable to their same inadequacies in security and privacy, and
      iv. They do not provide for large attachments, and
      v. They do not support audio or video email message formats, and
      vi. They do not offer biometric identity verification.
5. DIGI-SIGN
   a. They offer encryption technology as a means for security which requires the recipient to obtain the decryption software and a key.
   b. But their solution is inadequate because:
      i. They are not able to prove with biometric certainty that a message was received, and
      ii. They do not offer a separate, secure network and infrastructure and email management system, and thus can not provide adequate levels of security and privacy, and
      iii. They do utilize existing open/public email systems and thus are vulnerable to their same inadequacies in security and privacy, and
      iv. They do not provide for large attachments, and
      v. They do not support audio or video email message formats.
6. WHALE MAIL
   a. They provide the ability to send large files using their own FTP system
   b. But their solution is inadequate because:
      i. They are focused on the files and not both the message and files (attachments) combination, and
      ii. They do offer a separate network and infrastructure, but are not adequate in their levels of security, privacy and identity verification as is required for the exchange of confidential, high-value messages and files, and
      iii. They are not able to prove with biometric certainty that a large file was received or sent by specific users, and
      iv. They do not support integrated audio or video email messages, unless as an "out of context" attachment, and
      v. They do not support adequate identity verification of both sender and recipient
      vi. They do not offer biometric identity verification.
7. YOUSENDIT
   a. They provide the ability to send large files using their own FTP system
   b. But their solution is inadequate because:
      i. They are focused on the files and not both the email message and attachments combination, and
      ii. They do offer a separate network and infrastructure, but are not adequate in their levels of security, privacy and identity verification as is required for the exchange of confidential, high-value messages and files, and
      iii. They are not able to prove with biometric certainty that a large file was received, and iv. They do not support integrated voice or visual message formats, unless as an "out of context" attachment, and
v. They do not support adequate identity verification of both sender and recipient
vi. They do not offer biometric identity verification.

8. DIGITAL PERSONA
    a. They offer biometric security and identity verification products and capability
    b. But their solution is inadequate because:
        i. it does not provide a system or infrastructure to send secure email messages and attachments, and
        ii. it does not provide a system or infrastructure to receive secure messages and attachments, and
        iii. It does not have the ability to exchange audio email messages, and
        iv. It does not have the ability to exchange visual (video) email messages, and
        v. It does not have the ability to send large files.

9. Package/Shipping Companies (FEDEX, UPS, DHL & USPO)
    a. They focus on package delivery with tracking and delivery dependability. They use private networks to allow for control, tracking and traceability, but they ship to "any adult" at the address specified, and not to a specific person
    b. But their solutions are inadequate because:
        i. They take a day or more to deliver a physical package as compared to email systems which delivery electronically, and
        ii. They delivery to an address, not to a specific person, and
        iii. They do not confirm the recipient; any adult at the address specified can sign for delivery, and
        iv. They do not offer biometric identity verification of either a sender or recipient, and
        v. They do not allow the integrated delivery of electronic emails and attachments, and
        vi. They do not accommodate expedited delivery of very large attachments, except on CD or other media on an overnight basis, and
        vii. They do not support expedited delivery of voice or video message formats, except on CD or other media on an overnight basis.

SUMMARY OF THE INVENTION

The Invention is the first-ever, biometric-enabled, point-to-point encrypted, certified email system providing a worldwide community of users with the highest levels of identity verification, security and privacy, and proof of delivery when exchanging important, high-value email messages and files. See FIG. 1. Messages can be in text, audio and visual formats, with attachments generally up to 4 gigabytes in size, but it can be expanded. Recipients can either read the sender's email text message, hear the sender speak the message, or watch (and hear) them speak.

Professionals wanting a complete solution and worldwide eDelivery options designed to be a maximum-security, as-needed alternative to their everyday email systems, including; Corporate Executives, Entrepreneurs, Government Representatives, Security Specialists, Lawyers, Accountants & CPA's, Bankers, Doctors, M & A Professionals, Students, Researchers, Consultants, Engineers, Designers, Builders, Realtors, Photographers, Musicians and other Professionals.

Four things distinguish the Invention, the Invention provides its certified email senders and recipients with the highest levels of (See FIG. 2):

1. Biometric Identify Verification
    a. By utilizing state-of-the-art biometrics (initially registered fingerprint scans), the ultimate in identify verification; which confidently answers the question, "Is that really you?" Various levels of vetting are provided via Credit Card authorization, fingerprint scan, Notary Public certification, phone number, address, email address and more.

2. Security and Privacy
    a. By utilizing its own private, fully-encrypted, email network and infrastructure for exchanging personal messages; in text, audio and visual formats. This separate system avoids the privacy and security problems that come with many everyday, public email systems and their use of the low-security and vulnerable public Internet.

3. Proof of Delivery
    a. By utilizing its email management processes for email composition and logging (recording) all related delivery events as they occur, such as: when the sender's certified email was sent, when an alert notification (eDelivery email form, SMS, IVR, . . . ) was sent to their recipient(s), if and when the certified email was "signed for" (and how they signed—e.g., by fingerprint scan or electronic signature, this is called "delivery acceptance"), and if and when an attachment was viewed and/or downloaded.

4. Additional Message Formats
    a. By utilizing 3 sender options for creating the email message itself, 1) text (words), 2) audio (voice message) and 3) visual (video with sound). Again, recipients can either read the sender's email text message, hear the sender speak the message, or watch and hear them speak it.

Additional Message Formats.

First, this multi-option set of formats is not the simple attaching of text (the written word), audio (voice) or visual (video) files to an email message. These message options relate to integration with, and are specific to, the main purpose of the email message itself, and are not "just attachments" to an email. The addition of audio and visual format options to the standard text format option provides senders more effectiveness, more preciseness, more personalization and more flexibility (e.g., no keyboard use necessary) in creating their communications with the intended recipient.

The main purpose of an email is to communicate a message (thought, idea, reaction, instructions, . . . ) or to introduce an attachment(s). The challenge is that the written word is not always the most convenient, expeditious or appropriate way to communicate to others. But, it is the standard in our everyday email exchanges.

Envision hearing these messages in an audio format or even watching them in a visual (video) recorded format.

For example:

"Joe, I received your proposal and don't have time to write a formal response. So, until I can do that, this message will highlight my main concerns, first . . . "

"Susan, I couldn't reach you by phone and didn't want to leave a voice mail at the house. Please accept my heart felt condolences on the loss of . . . "

"Larry, this is one of the most difficult things I've ever had to do and I wanted to be sure you heard it directly from me, even though you're half way around the world right now. I've decided . . . "

"Vladimir, I tried to apply what you taught me and write you a note in Russian . . . but I struggled. So, I'll have to settle for the spoken word at this time. So, here goes, dobro pozhalovat . . ."

The ability to conveniently record and send such an audio or visual message within a certified email system (along with its biometric identity verification, secure infrastructure and proof-of-delivery features), would provide senders the effectiveness, precision, personalization and flexibility mentioned above, all within a safe and secure environment.

If the email message included an introduction of an attachment(s), which is common, the examples might read, sound or look like this:

"Linda, Guess what? I'm engaged. Here's my new ring . . . can you see it? I'm so excited. John is so wonderful and kind. Look at the attachment and you'll see him at one of his charity events. He's so handsome. Call me today and I'll give you all the details. Don't tell anyone you saw my ring until I tell others about it. See ya again later."

"Mom, it's your favorite, penniless son far away at college. I had to buy these really cool new glasses. Don't I look great! What do you think? By the way, attached is the Optometrist bill. Love ya . . . you're the best!"

"Dr, Edwards, I have this new growth on my nose and I'm very worried. I'll lean forward here so you can get a better look. What do you think? Please let me know what I should do. I'm very concerned. I'm sure you can see that on my face. I took a close-up picture and attached it as well. Please send me a confidential response to this."

In scenarios like this, especially if they were in a visual format, it would be as if the recipient was sitting across from the sender as they listened and/or viewed the certified email message.

BRIEF DESCRIPTIONS OF THE DRAWINGS

The drawings aid the understanding of the Invention and are not intended to limit the scope of the invention in any manner beyond the scope of the claims.

FIG. 1—a high-level graphic contrasting the message exchange of two email users interacting in the "Public Internet" vs. the Private, Bio-Enable Network of the Invention.

Figure 2:
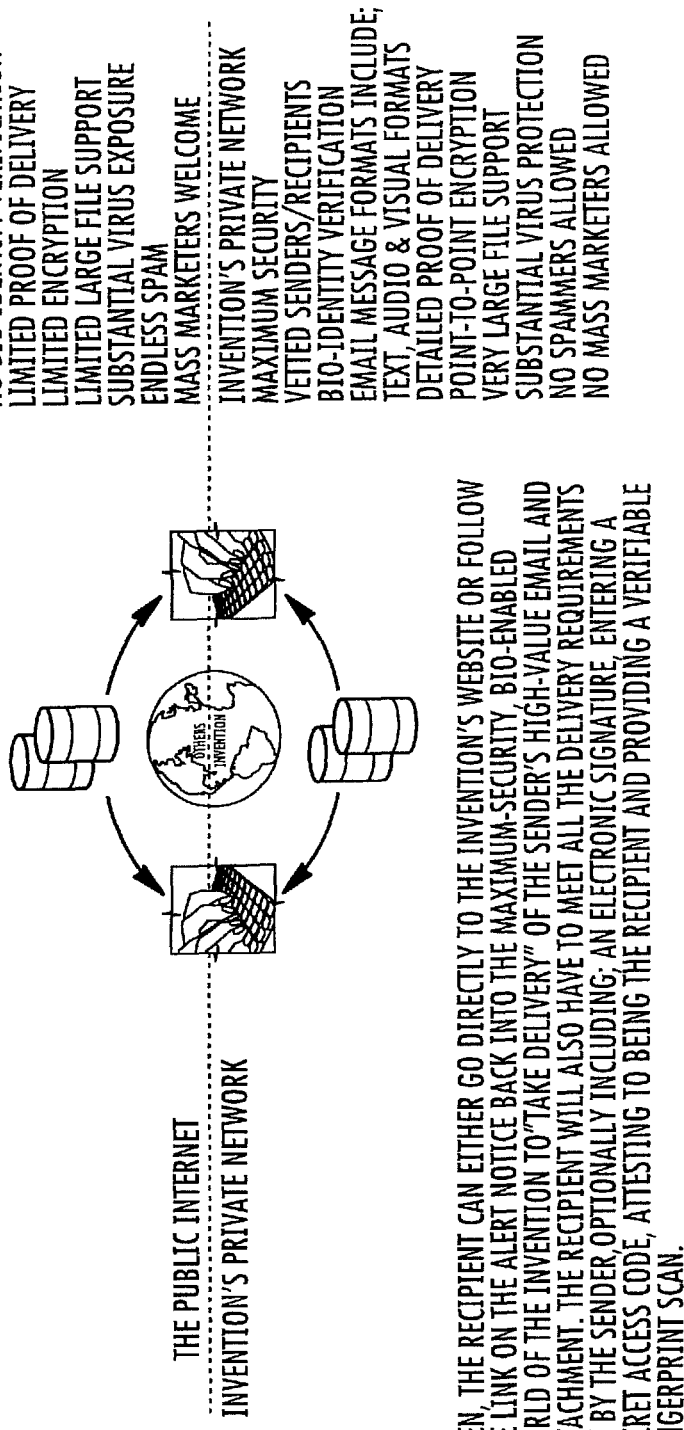

FIG. 2—a detailed graphic showing how the system uses both the "Public Internet" for alert notices and the Invention's Private, Bio-Enable Network for sending, receiving, tracking and managing certified emails.

Figure 3:
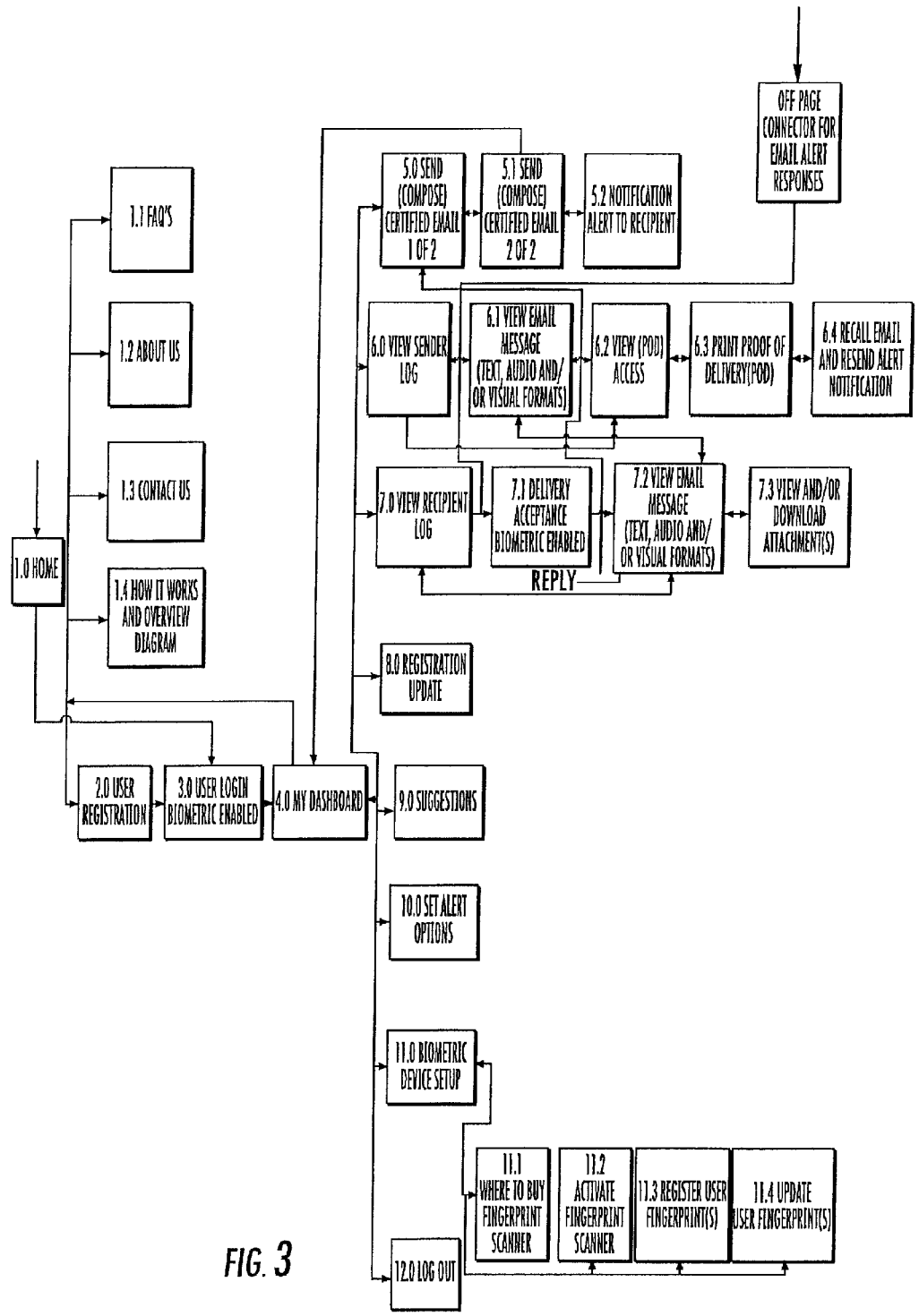

FIG. 3—a process flowchart showing the main procedures in the Invention; which collectively provide a complete solution for its users wanting a certified email message and attachment system with the features and benefits previously stated herein.

DESCRIPTION OF THE PREFERRED EMBODIMENTS

The inventors have an initial preferred embodiment of a company, a website, a network, an infrastructure, a series of servers, an email management system and an operator to support the implementation of a certified email system with the main processes described below. Such website, network, infrastructure, servers and email management system is collectively the first-ever, biometric-enabled, point-to-point encrypted, certified email system providing a worldwide community of users with a "complete solution" including the highest levels of identity verification, security and privacy, proof of delivery and effectiveness in communications when exchanging important, confidential, high-value email messages and attachments. These email messages can be communicated in text, audio and visual formats, and include large attachments, for example 4 gigabytes or larger in size.

It's important to point out that there are usually two email systems used with the Invention. First, there is the registered user's current, everyday email system (e.g., Hotmail, AOL, MSN, Outlook, etc.), if they have one, where they will receive alerts (called eDelivery forms) from the Invention that say "you've got certified mail". Note—such alert notices can also be sent to a user's cell phone (via SMS—Short Message System) or to their land line phone (via IVR—Integrated Voice Response), or equivalent, if such alert options are selected by the user. Second, there is the Invention's separate, private, high-security email network and infrastructure (including secure servers) that such users utilize when actually sending, receiving, tracking and managing email messages and attachments via the Invention's website (referred to as "website" or "system" or "the Invention's website or system" in the process discussion below). See FIGS. 1 and 2. Just as the Post Office, FedEx and UPS uses completely different processes and infrastructures for their certified mail/package delivery services, the Invention uses the same separation concept in its management and transport of certified email messages and attachments.

Home—The Home process 1.0, as illustrated in FIG. 3, is the starting point for users of the Invention. Note that processes 1.0 through 12.0 are all illustrated in FIG. 3. The Home process 1.0 allows users to become more informed as to the Inventions features, functions and purpose through access to Frequently Asked Questions (FAQ's) 1.1, About Us 1.2, Contact Us 1.3 and How It Works 1.4.

User Registration—The Invention's website visitor selects the "User Registration" process 2.0 (FIG. 3) and fills out the required user information, including (for example) an existing email address they want to use as their User ID when logging into the website, and a password. This process allows users to register to officially use the Invention and is designed to do initial vetting of the users. Other information gathered includes: name, address, phone number, and credit card number; to insure the operator has a good understanding of who is using the Invention. Other user information is gathered in other processes, for example, a user's fingerprint and a Notary Public certification. They will also receive a registration confirmation notice at the email address they supplied (or by SMS or IVR, if such option is selected by user) and they will have to respond in order to activate their user status and be able to login to the website going forward. If they don't receive an email confirmation notice, they should be sure that their spam filter hasn't intercepted it for some reason; that happens occasionally when using the email notice option.

Note 1—the Invention's certified email messages and attachments are private and confidential between sender and recipient, and its registered users are vetted in many ways (credit card, fingerprint, notary certification, phone number, address, email address and more). And, such vetting levels are displayed by the system to both senders and recipients. Note 2—the system does not allow mass marketing companies, who send large numbers of emails to recipients (that they may or may not know), to become registered users of the website. These companies and spammers in general have no ability to send large numbers of emails in the Invention; which has purposely limited the number recipients per email to dissuade any such attempt by any registered user. Note 3—the Invention works on the premise that vetted user/senders (identified at various levels) are far less likely to intentionally send a virus, spyware or other malware in their emails and attachments.

User ID—A registered user's current, everyday email address is often used as their User ID in the Invention's website. Their cell phone number or landline phone number can also be used as an User ID in the system. These are also a key in its databases and can only be changed by special system request.

Fees and Service Levels—Registration and usage of the website requires paying a monthly or annual fee; or, a per-unit (per email) fee can be charged. There are many ways to charge for such services. Registered users of the Invention will initially have service levels as follows (which are subject to change): 1) unlimited sending and receiving of local and international emails via the system, each with a 4 GB attachment maximum, 2) 10-20 GB in long-term attachment storage and 3) 100 GB in monthly download bandwidth. Additional storage and bandwidth can be purchased.

User Login—To get started after a new user's status is activated, select the "User Login" process 2.0 (FIG. 3) to sign in and start a user session. After login, the user will automatically proceed to the My Dashboard process 4.0 (further described below). This requires the User ID and password to be provided during the registration process. Once the user installs an approved fingerprint scanner and registers their actual fingerprint with the system (and optionally confirms it with a separate Notary Public certification), which activates the biometric features of the system, then users can scan their fingerprint in lieu of entering the password. As a bio-registered user that uses their fingerprint scanner to login, a recipient will see that the sender is at one of the highest levels of vetting in the system and their emails will be identified as being "biometrically certified".

Send (Compose) Certified Mail—Select the "Send (Compose) Certified Mail" processes 5.0 and 5.1 (FIG. 3) to compose certified email messages and send each to a set number of recipients at a time. The Invention is not designed or intended to be a mass emailing system. After initially registering, it is suggested that a new user send the system a certified "Hello" email. The user should send one to themselves as well to experience the recipient "delivery acceptance" process and add an "Access Code" (a secret code only they and their recipients know) to make it even more secure. The system will send them back a certified email as well.

When users select the "Send (Compose) Certified Mail" process and begin with 5.0 then proceed to process 5.1 to create their certified email and identify the recipients. There are a variety of reasons for this 2-step compose process, including the need to determine if the specified recipients are already registers users (and if they have their fingerprint registered as well); which would give the sender more options to specify their recipients' delivery acceptance rules. They can enter a text version of the email "subject line" and "message" (other formats described below) at this point and identify all intended recipients. If such an alert option is selected in process 10.0, the email subject line is also displayed in the alert notice (eDelivery form), generated in process 5.2, sent to the recipient to inform them that have certified email waiting for delivery. The subject line gives them an idea of what the email concerns.

Because the system will inform the user/sender if they have entered an email address for a registered or unregistered recipient, as they proceed from processes 5.0 to 5.1, senders can then set the delivery acceptance rules for each recipient and select their attachments in process 5.1. These delivery acceptance rules includes 1) an electronic signature (the default), 2) an access code (a secret code or password only known by the sender and the recipient), 3) a fingerprint scan to insure the recipient's identity (note—the system knows if a recipient has activated this biometric capability), and 4) the sender can insist that a non-registered recipient registers before taking delivery of their certified email. For non-registered recipients the sender is required to spell their name (first and last) for the system so the electronic signature process knows what name to check for during delivery acceptance.

Audio and visual email message format options, also created on the "Compose Certified Email" process, are described below.

Email Message Format Options—the "Send (Compose) Certified Email" process 5.0 (FIG. 3) supports 3 options (text, audio and visual) for the email message formats that users can select (plus any number of attachments in 5.1). This will add flexibility and precision to a user's email message exchanges, as previously explained in "Field of the Invention" in Section—Background of the Invention. So, after recipients "take delivery" of a sender's email, they can read the words written by the sender, hear the sender speak their words or see and hear them speak their words.

The numerous combinations of text, audio and visual formats, presented in an integrated and coordinated fashion within the Invention's certified email system, create an appealing and powerful way to send email messages, including: 1) a text message by itself, 2) text message and attachment, 3) audio message, 4) audio message and attachment, 5) visual message, and 6) visual message and attachment. The combinations are many and ultimately get to this combination: a text message, an audio message, a visual message and an attachment (one or many).

Attachments—In the "Attachment" process (a sub process within Send-Compose Email Message process 5.1), the Invention's system allows for the attachments in many formats such as PDF, DOC, pictures, voice files, movie files, virtually any of the formats can become attachments within the system's secure environment. In this system, the user is essentially uploading their attachments to the Invention's secure server rather then attempting to send them to, and risk clogging up of, the recipient's everyday email system. This is particularly a problem with very large files causing many such emails to be rejected (a.k.a. "Undelivered Mail Returned to Sender"). When a recipient receives (takes delivery of) the system's certified email message (7.1) they also can take delivery of the attachments (7.3, via 7.2), if supplied by the sender. The sender can also designate whether the attachment can to be "viewed" only or if the recipient will be also be allowed to actually download it (see process 7.3). If view only, the file will not physically leave the invention's secure servers and, as a result, is not transferred to the recipient's computer. Each of these actions is logged, as they occur, to provide the sender proof of delivery and proof of what files were delivered and how.

Alert Notifications—"You've got certified email" alert notices are sent in the Notification Alert to Recipient process 5.2 (FIG. 3) to all recipients based on the alert options set by the user in "Set Alert Options" process 10.0. Alert notices can be sent (potentially multiple times, to insure prompt pick up) via email, cell phone (using SMS) or landline phone (using IVR). Alerts sent via email with include (if such option is selected by user) a URL link back to the Invention's website where the user can gain access to the certified email and its attachments. But, first they must go through the Delivery Acceptance process 7.1.

If such option is selected by the user in process 10.0, alerts can also be sent to users of the system to indicate that activity has occurred on certified emails and attachments they have previously sent. This could include, for example, that a recipient has taken delivery of (e.g., signed for delivery) of the email the user sent them. This saves the user from having to log into the system to determine that this has occurred.

For textual, audio and visual email messages sent by users in the Send (Compose) Certified Email processes 5.0 and 5.1, such certified messages can also be delivered directly to a cell phone (or cell phone-computer device like the Apple iPhone) or landline phone via IVR as long as the recipient can prove who they are and can meet the delivery requirements (e.g., identity verification) set by the sender in process 5.1.

View Sender Log and View Recipient Log—Users can select the "View Sender Log" process 6.0 or the "View Recipient Log" process 7.0 (both in FIG. 3) to monitor the sending and delivery process for certified emails. Remember, when users send a certified email via the website, an alert notice is also sent to their recipient's email address in process 5.2 which contains a "you've got certified mail" notice and a URL link back to the system's separate, high-security infrastructure where they can "sign for" and "take delivery" of the sender's private email message in the Delivery Acceptance process 7.1 (e.g., electronically sign for delivery, similar to the FedEx or UPS process when they come to a recipient's front door) and any attachments the sender may have also sent. After delivery acceptance, users can view, hear or see the certified email message in the View Email Message process 7.2 and access related attachments in View and/or Download Attachments process 7.3.

The sender and recipient logs (6.0 and 7.0) in the Invention contain valuable tracking information. They tell the sender (and recipient) when the user's certified email was sent, when an alert notice email was sent to the recipient(s), if and when the certified email was "signed for" (called "delivery acceptance" 7.1), and if and when it was viewed and/or downloaded. Note—if a user is logged in (3.0) to the website and receives an email from another registered user of the system (or from themselves when testing the Invention), they can take delivery (7.1) of the email from within the website directly from the Recipient Log 7.0, just as if they had clicked the link provided on the alert notice email from the sender, if so selected by user in the Set Alert Options process 10.0. Note—such alert notices can also be sent via cell phone using SMS or landline phone using IVR, or equivalent, if so selected in process 10.0.

From the View Sender Log process 6.0 senders can "recall" or "resend" (in process 6.4) their previously sent certified email messages and attachments, sent via the Invention. This gives the sender the ability to quickly react if they made a mistake or if the recipient wanted the alert notice sent to a different address or in a different format. In other, everyday email systems, there is no certainty that a sender can successfully recall (pull back) an email before it is placed for viewing in the recipient's email system (especially if there are multiple recipients). This Invention does allow the sender to recall the certified email and be certain, by viewing the related sender log entries (6.0 and 6.2), that a specific recipient (which could be one of many) has or has not yet seen the contents.

Print Log and Proof of Delivery Document—Users can print a "Proof of Delivery" (a.k.a. "Proof of Service") document in process 6.3 (FIG. 3) by going to the View Sender Log process (6.0) and selecting a specific email that was previously sent and then selecting "Access". This access log receipt process 6.2 will display the Email and Attachment Access Log with all the delivery activity events (listed above) on this certified email to date. Select the "Print POD Log" process 6.3 to print the "Proof of Delivery" document which shows the original certified email contents and lists attachment(s). It will also list all recipients and the delivery acceptance requirements that were set by the sender. Also, a log of events will be displayed that shows all relevant delivery activity for the selected email. Proof of Delivery emails and CD's (or other media) will also be available to allow the actual attached files and voice and visual/video files be made available to those want to prove the circumstances related to such certified emails and attachments sent via the Invention.

Fingerprint Scanners—refer to the Biometric Device Setup process 11.0 (FIG. 3) for general information on all such devices and their activation. The Invention's system currently supports fingerprint scanners in its biometric identity verification processes and can be purchased via the website's operators or elsewhere on the Internet. Refer to Where to Buy Fingerprint Scanner process 11.1 for specific information on where and how to buy such a device. The Invention currently supports the U.are.U 4000B USB Reader from DigitalPersona, Inc, and may support other vendors' devices in the future. The system also supports other models of DigitalPersona's biometric product line, including those that are built into many popular computer laptops like those from Dell and Lenovo (previously IBM). If not a "built-in" as just mentioned, the system's users will have to buy specific, approved fingerprint scanner devices from the Invention's operators or as directed in process 11.1 because such devices may have to utilize drivers modified to support the Invention's unique, browser-based biometric implementation and operational processes. If users already own a 4000B USB reader, they will need to contact the system's operator for special instructions on installation (refer to process 11.0). Note—until users have an approved scanner, ignore (bypass) the fingerprint process on the Login process 3.0. In the interim, registered users can use (for example) their email address and private password to complete login. Once a biometric identity capability is implemented, this option to use a password may or may no be approved, based on several variables and user set options.

Registration Update—Select the "Registration Update" process 8.0 (FIG. 3) to make basic changes in user information. Some user information cannot be changed on this screen and, as a result, users will have to contact the operator to help with that change (e.g., email address as the user's User ID). This is necessary because this has become a "key" field in our databases and must be changed in a special process. Notice that the website will be optionally gathering the user's cell phone number as well because the system will be sending text alerts messages (in Notification Alert to Recipient process 5.2) to cell phones (and to land line phones, as telephone companies implement this and equivalent features in the future), based on user options set in the Set Alert Options process 10.0.

Biometric Device Setup—Select the Biometric Device Setup process 11.0 (FIG. 3) to setup and activate biometric devices supported by the Invention. Fingerprint scanner software drivers can be downloaded and the device activated in the Activate Fingerprint Scanner process 11.2 to support the installation on the user's computer. And, a user's actual fingerprints can be initially "registered" in the Register User Fingerprint(s) process 11.3 and subsequently updated (changed) in the Update User Fingerprint process 11.4. This means the user's fingerprint is scanned and a numeric representation is stored for use in the Invention's matching and identification algorithms. As other devices are added to the Invention's biometric capabilities, process 11.0 will be expanded. Note—the system does not store the actual fingerprint image for any of its registered users; rather a numeric representation.

My Dashboard—Select the "My Dashboard" process 4.0 (FIG. 3) to view the registered users personalized Dashboard which provides a high-level, control window for the user's many global communications activities in the system. The Dashboard is where users land (go to) after each Login process (3.0) and after the Send (Compose) Certified Email (5.0) and both View Log processes (6.0 and 7.0). The Invention uses a window on this screen to inform all registered users with various news and update items. The Invention will also provide a ticker tape (rolling) window here to display and monitor, as they occur, the delivery activity events of many certified emails simultaneously, and provide other insightful real-time statistics about the user's entire experience with the Invention.

Suggestions—Lastly, select the "Suggestions" process 9.0 (FIG. 3) to let the websites operators know of user suggestions and problems, as they occur. The Invention provides FAQ's (1.1) that are very helpful in answering user questions.

Log Out—the Log Out process 12.0 (FIG. 3) is used to log out and terminate the current user session of the Invention's website.

In a preferred embodiment, a method of communication between a sender and a recipient initiates once a sender logs onto "SenditCertified.com", a private network, and identifies themselves. The sender composes a message via text, audio and/or video format on a network device. A network device is a computer, a cellular phone, a PDA, or other type device capable of communicating with a server or computer. The sender then seals the message via a biometric indentification, secret access code, electronic signature or by independent verification. In other words the sender seals the message by identifing himself or herself, preferably by biometric indentification. Thereafter the server of the private network encrypts the message and the sender sends it to the recipient over the private network. The private network does not use the internet, does not use server to server duplication or store and forward protocol. The encrypted message proceeds from the sender's network device to the private network server where it waits delivery to the recipient. The server notifies the recipient of the message and states the conditions under which the recipient can take delivery of the message. After the recipient meets the conditions to take delivery, the server un-encrypts the message and the recipient takes delivery of the message, via a second network device, which may be under the control of the recipient.

The server tracks the progress of the send message, records the tracking information, such as time and place sent, size of message, type of message, conditions of delivery, and recipient identification, such as name, secret access code, biometric indentification information and/or other information of recipient.

The biometric identification may be fingerprinting, iris scan, facial recognition, or DNA. Preferably the biometric information is fingerprinting. Additionally, the sender and recipient may confirm their identity via an independent vetting process with said private network. The independent vetting process may include electronic signature, secret access code, or other independent information, such as credit card numbers, answering secret questions, driver's license, and/or passport or social security information.

Thus it is apparent that there has been provided, in accordance with the invention, an improved certified email messages and attachments, that fully satisfy the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A certified email system for exchanging confidential messages and attachments which comprises:
    (a) an Internet-based email system and a separate and secure private communication network, infrastructure, and set of servers configured to insure security and privacy of email exchange,
    (b) a biometric function to insure identity verification of senders and recipients, wherein only a numeric representation of a fingerprint image is stored for authentication purposes, not the fingerprint image itself,
    (c) an email management system to support email composition, delivery traceability, proof of delivery, sender and recipient activity logs, alert notifications, and attachments in many formats,
    (d) a user vetting function that confirms identity via user supplied information, wherein the user vetting function is configured to authenticate the user during a registration process to ensure the user's identity prior to setting up biometric information for the user and the user vetting function comprises gathering any of credit card, fingerprint, notary certification, phone number, address, and email address of the user,
    (e) a biometric device setup function, initially to allow users to set up a fingerprint scanner device, download necessary driver software, and to register their actual fingerprints for matching and authentication purposes,
    (f) a delivery acceptance function that allow recipients to take delivery in a number of ways,
    (g) an audio email message format and function to support voice messaging and to enhance effectiveness of communication exchanges,
    (h) a visual message format and function to support video messaging and to enhance effectiveness of communication exchanges,
    (i) a recall function to allow senders to recall previously sent emails and attachments,
    (j) a resend function to allow senders to resend alert notifications via email, cell phone, and land line phone,
    (k) a reply function to allow recipients to respond to a sender's message and maintain a dialog with another user,
    (l) a user dashboard to monitor and control email message and attachment sending and receiving activities,
    (m) an attachment "view only" function and "view and download" function to give senders the ability to control attachment access by a recipient, and
    (n) a user alert notice option setting function that will control sender and recipient alert notifications;
    wherein (b)-(n) are provided in the separate and secure private communication network, infrastructure, and set of servers and the sender and recipient alert notifications are provided to the Internet-based email system.

2. A method of communicating between a sender and a recipient, comprising:
    a) composing a text, audio, or video message on a network device,
    b) sealing said message with biometric identification of the sender, wherein only a numeric representation of biometric information is stored for authentication purposes, not the biometric information itself, and wherein the biometric information of the sender is previously verified through a user vetting function configured to authenticate the sender during a registration process to ensure the sender's identity prior to setting up biometric information for the sender, c) encrypting said message, d) sending said encrypted message over a private network, that uses no server to server duplication or store and forward protocol, e) tracking said sent encrypted message, f) informing the recipient of the message to take delivery of the message, and g) allowing the recipient to take delivery of the message after the recipient confirms his/her identification with biometrics, and after un-encrypting the message;

wherein steps (b)-(g) are performed in a separate and secure private communication network, infrastructure, and set of servers and sender and recipient alert notifications are provided to an Internet-based email system.

3. The method of claim 2, wherein said biometric identification comprises fingerprinting, iris scan, facial recognition, or DNA.

4. The method of claim 2, wherein the sender and the recipient confirm their identities via an independent vetting process with said private network.

5. The method of claim 2, wherein sending the encrypted message over the private network includes the message being sent from said network device to a private network server.

6. The method of claim 5, wherein said recipient takes delivery on a second network device directly from said private network server.

7. The method of claim 6, wherein said step of un-encrypting the message is performed by said private network server.

8. The method of claim 7, wherein the step of informing the recipient of the message is performed by said private network server.

9. The method of claim 8, wherein said tracking step is performed by said private network server.

10. A method of communicating between a sender and a recipient, comprising:

a) composing a text, audio, or video message on a network device, b) sealing said message with the identification of the sender, wherein only a numeric representation of biometric information is stored for authentication purposes, not the biometric information itself, and wherein the biometric information of the sender is previously verified through a user vetting function configured to authenticate the sender during a registration process to ensure the sender's identity prior to setting up biometric information for the sender, c) encrypting said message, d) setting the delivery requirements for the recipient to take delivery of said message, e) sending said encrypted message over a private network, that uses no server to server duplication or store and forward protocol, f) tracking said sent encrypted message, g) informing the recipient of the message to take delivery of the message, and h) allowing the recipient to take delivery of the message after recipient meets said delivery requirements, and after un-encrypting the message;

wherein steps (b)-(h) are performed in a separate and secure private communication network, infrastructure, and set of servers and sender and recipient alert notifications are provided to an Internet-based email system.

11. The method of claim 10, wherein said step of sealing the message occurs with biometric identification, electronic signature, secret access code, or independent verification by sender.

12. The method of claim 10, wherein said delivery requirements include biometric identification, electronic signature, secret access code, or independent verification by sender.

13. The method of claim 10, wherein sending the encrypted message over the private network includes the message being sent from said network device to a private network server.

14. The method of claim 13, wherein said recipient takes delivery on a second network device directly from said private network server.

15. The method of claim 14, wherein said step of un-encrypting the message is performed by said private network server.

16. The method of claim 15, wherein the step of informing the recipient of the message is performed by said private network server.

17. The method of claim 16, wherein said tracking step is performed by said private network server.

18. The system of claim 1, wherein the user vetting function confirms identity via user supplied information via a notary public.

19. The method of claim 2, wherein the user vetting function is configured to authenticate the sender via a notary public.

20. The method of claim 10, wherein the user vetting function is configured to authenticate the sender via a notary public.

* * * * *